United States Patent
Huber et al.

(10) Patent No.: US 9,377,532 B2
(45) Date of Patent: Jun. 28, 2016

(54) TOF DISTANCE SENSOR AND METHOD FOR OPERATION THEREOF

(71) Applicant: ESPROS Photonics AG, Sargans (CH)

(72) Inventors: Dieter Huber, Maennedorf (CH); Markus Ledergerber, Buchs (CH)

(73) Assignee: ESPROS Photonics AG, Sargans (CH)

( * ) Notice: Subject to any disclaimer, the term of this patent is extended or adjusted under 35 U.S.C. 154(b) by 277 days.

(21) Appl. No.: 14/100,319

(22) Filed: Dec. 9, 2013

(65) Prior Publication Data

US 2014/0160459 A1 Jun. 12, 2014

Related U.S. Application Data

(60) Provisional application No. 61/739,204, filed on Dec. 19, 2012.

(30) Foreign Application Priority Data

Dec. 12, 2012 (EP) ..................................... 12008305

(51) Int. Cl.
G01C 3/08 (2006.01)
G01S 17/08 (2006.01)
G01S 7/486 (2006.01)

(52) U.S. Cl.
CPC ............... *G01S 17/08* (2013.01); *G01S 7/4865* (2013.01)

(58) Field of Classification Search
CPC ......... G01S 17/08; G01S 17/10; G01S 7/486; G01S 7/4865
USPC ........................................................ 356/5.01
See application file for complete search history.

(56) References Cited

U.S. PATENT DOCUMENTS

| 7,864,303 B1 * | 1/2011 | Benz | ...................... G01S 7/486 356/3.01 |
| 2011/0301914 A1 * | 12/2011 | Maltseff | ................. G01S 17/36 702/159 |

FOREIGN PATENT DOCUMENTS

| EP | 1 777 747 A1 | 4/2007 |
| EP | 2 402 783 A1 | 1/2012 |
| JP | 2008-164496 A1 | 7/2008 |

OTHER PUBLICATIONS

European Search Report (Application No. 12008305.0) dated May 14, 2013.

*Primary Examiner* — Mark Hellner
(74) *Attorney, Agent, or Firm* — Burr & Brown, PLLC (57) ABSTRACT

A TOF distance sensor is proposed, for measuring a distance from an object, comprising an electronics apparatus for generating a modulation signal and for generating four correlation signals, which are phase shifted with respect to one another and which have the same period as the modulation signal; a radiation source for emitting radiation, which is modulated by the modulation signal; a reception apparatus, which has a predetermined spatial relationship with respect to the radiation source, for receiving radiation reflected by the object; a correlation apparatus for correlating the received radiation or a corresponding variable with respectively one of the four correlation signals in order to form four corresponding correlation values; a difference-forming apparatus for forming two difference correlation values from the difference between respectively two of the correlation values; a calculation apparatus embodied to calculate the distance with a predetermined linear dependence on the two difference correlation values.

24 Claims, 6 Drawing Sheets

TOF DISTANCE SENSOR AND METHOD FOR OPERATION THEREOF

CROSS REFERENCE TO RELATED APPLICATIONS

This application claims the benefit under 35 USC §119(e) of U.S. Provisional Application 61/739,204, filed Dec. 19, 2012, and claims the benefit under 35 USC §119(a)-(d) of European Application No. 12 008 305.0 filed Dec. 12, 2012, the entireties of which are incorporated herein by reference.

FIELD OF THE INVENTION

The invention relates to a TOF (time of flight) distance sensor and to a method for operating a TOF distance sensor.

BACKGROUND OF THE INVENTION

The prior art has disclosed 2-tap TOF distance sensors, the operation of which is based on the use of sinusoidal signals.

SUMMARY OF THE INVENTION

It is an object of the invention to develop the prior art.

The TOF distance sensor according to the invention for measuring a distance from an object comprises an electronics apparatus for generating a modulation signal and for generating 4 correlation signals, which are phase shifted with respect to one another and which have the same period as the modulation signal. It furthermore comprises a radiation source for emitting radiation, more particularly IR radiation, which is modulated by the modulation signal. It furthermore comprises a reception apparatus, which has a predetermined spatial relationship with respect to the radiation source, for receiving radiation reflected by the object. It furthermore comprises a correlation apparatus for correlating the received radiation or a variable corresponding to the received radiation with respectively one of the 4 correlation signals in order to form 4 corresponding correlation values. It furthermore comprises a difference-forming apparatus for forming 2 difference correlation values from the difference between respectively 2 of the correlation values. It furthermore comprises a calculation apparatus embodied to calculate the distance with a predetermined linear dependence on the 2 difference correlation values.

The calculation apparatus is preferably embodied to calculate the distance with a predetermined exclusively linear dependence on the 2 difference correlation values.

An object can more particularly be a person or a moveable or fixed object or a wall.

The radiation source is preferably a semiconductor radiation source, preferably an LED (light-emitting diode) or a plurality of LEDs. The emitted radiation can be visible or non-visible light, for example IR (infrared), VIS (visible) or UV-radiation (ultraviolet). In particular, the emitted radiation can be substantially monochromatic, i.e. with a full-width at half maximum of less than 10%, more particularly less than 5%, more particularly less than 2%, more particularly less than 1%, more particularly less than 0.1% of the wavelength.

In particular, the waveform of the modulation signal and/or of the correlation signals can have at least partly constant and/or linear sections. In particular, the waveform can be embodied as a triangular form, as a sawtooth form with a largely vertical flank, as a trapezoidal form or as a rectangular form. In particular, the waveform of the modulation signal can differ from the waveform of the correlation signals. In particular, the modulation signal can be a sinusoidal signal. In particular, the correlation signals can have a waveform which periodically alternates above and below a threshold. In particular, the correlation signals can be rectangular signals. In the case of a non-rectangular profile of the waveforms for the modulation signal and/or correlation signals, it is possible to accept a small error in the calculation or the calculation apparatus can be supplemented by a correction function or a correction table.

In particular, the signal profile of the modulation signal and/or of the correlation signals can be periodic.

The same period can more particularly be defined by the same temporal sequence of proportionally equal maxima and minima of two signals in a time interval of the same length.

A predetermined spatial relationship more particularly means that the light source and reception sensor are spatially arranged in known fashion with respect to one another at the time of the reception and/or are close together in relation to the measured distance and/or are arranged on a common holder and/or are arranged in a common housing.

Correlation is the multiplicative operation of the temporal profile of two signals, more particularly with the same period. The correlation can be presented mathematically by the time integral of the product of two signal profiles over one period or a number of periods.

Phase profile means the temporal profile expressed in the phase values of the emitted radiation. Phase shifted means that the signals have time-offset profiles with respect to one another. The terms phase shifted and phase offset are used in equivalent fashion herein. Waveform and phase profile can denote the same term, provided this is a signal profile, with the phase-profile generally being considered to be normalized and a change in the maximum amplitude over a number of periods generally being discarded in the waveform.

In particular, some or all signals can be or become normalized to 1 for calculation purposes. This can be advantageous because the detected radiation intensity may vary depending on the situation.

Linear dependence can also mean a piecewise linear dependence, but not a piecewise approximated linear fit to a non-linear dependence per se.

Calculation of the distance can also be the calculation of a variable equivalent to the distance, such as e.g. the calculation of the phase shift of the received radiation with respect to the emitted radiation or the time offset between emitted and received radiation.

The term apparatus for denoting a functional unit does not necessarily mean a spatial unit but, more particularly, means the functional relationship.

The modulation signal and/or the 4 correlation signals are preferably embodied as rectangular signals.

A rectangular signal is substantially rectangular and substantially varies between two values, preferably between two positive values, preferably between zero and a fixed value. The rectangular signal preferably has a duty cycle (ratio of pulse duration to period duration) of 50%.

The rectangular signal can offer the advantage that it can be used for various types of light sources, more particularly for LEDs, independently of the radiation characteristics thereof.

The correlation signals are preferably respectively phase shifted by a quarter period with respect to one another and/or a correlation signal has the same phase as the modulation signal.

Phase shifted by a quarter period with respect to one another means phase shifted by pi/2 (90°). In particular, the first correlation signal can equal the modulation signal and hence equal the temporal profile of the emitted radiation, while the 3 further correlation signals can respectively be offset by a quarter period.

The difference is preferably in each case formed from correlation values, the associated correlation signals of which are phase shifted by a half period.

Phase shifted by a half period with respect to one another means phase shifted by pi (180°).

In particular, a first difference is formed from the correlation values, the associated correlation signals of which are phase shifted by 0 and by pi with respect to the modulation signal, and a second difference is formed from the correlation values, the associated correlation signals of which are phase shifted by pi/2 and 3pi/2 with respect to the modulation signal.

The calculation apparatus is preferably designed to associate the calculation with one of at least 2 different linear dependences as a function of the 2 difference correlation values and to calculate the distance as a function of the association.

Preferably 4 different linear dependences are provided for the association. The different linear dependences are preferably pre-stored.

As a result of the association it is possible to carry out a case distinction, particularly if the function for calculating the distance is only piecewise linear and/or piecewise constant. In particular, the association is carried out as a function of the signs of the 2 difference correlation values. In particular, the association is carried out as a function of the qualitative comparison of the values of the 4 correlation values. In particular, the association is carried out as a function of the comparison of the correlation values which are respectively associated with correlation signals which are offset by a half period.

The detected radiation signal is multiplied by signals with the same shape but with a respectively different, predefined phase, and integrated over time. Difference correlation values, which form a linear dependence as a measure for the phase shift of the detected radiation signal and hence for the distance from the object, emerge from the comparison of the correlation variables formed thus. However, these difference correlation variables are initially not uniquely associated with a specific phase shift, but have linear intervals as a function of the sought-after phase shift. The additional information required for this emerges from the signs of the formed difference correlation values. The linearity for the dependence with respect to the distance in this case results from the shape of the detected radiation signal and of the modulation signals, namely in the shape of periodically repeating rectangular pulses.

The reception apparatus preferably comprises a substrate with a photosensitive region for generating signal carriers and/or a drift gate for generating a drift field for transporting the signal carriers. The correlation apparatus preferably comprises at least one modulation gate for correlating the received radiation with at least one of the correlation signals by virtue of a spatial separation of the signal carriers being undertaken as a function of one of the correlation signals and/or at least one storage gate for temporal summation of the signal carriers, spatially separated in accordance with a correlation signal, for forming one of the correlation values and/or at least one storage element for holding another correlation value, more particularly a further storage gate.

Signal carriers can, in particular, be photoelectrons.

In particular, the reception apparatus and/or the correlation apparatus can be embodied using CCD technology. In particular, the calculation apparatus can be embodied using CMOS technology. In particular, the reception apparatus, the correlation apparatus, the difference-forming apparatus and the calculation apparatus can respectively be embodied partly or wholly using combined CMOS/CCD technology. Gates can be gates known from CCD semiconductor technology. The drift gate can also be formed by the modulation gate or gates. The modulation gate or gates can also be formed by the drift gate, e.g. by a gate made of material with electrical resistance. The literature occasionally refers to the drift gate as a photo-gate. In particular, a correlation signal can be applied to a modulation gate so that it acts as changeable lock, corresponding to the correlation signal, for the signal carriers in order thus to generate a passage of the signal carriers corresponding to the correlation value. The summed signal carriers of a storage gate forms the value for a correlation value. In particular, the stored charge can form a value for the correlation value. In particular, a storage gate can be read out at specific time intervals. In particular, a storage gate can be read out via a transfer gate, a floating diffusion and a source follower.

In particular, the storage element can store a correlation value that is different from the storage gate, more particularly a correlation value, the associated correlation signal of which is phase shifted by a half period with respect to the correlation signal of the storage gate. This can be advantageous in that the aforementioned difference formation between these two correlation values is also easily possible for a so-called 1-tap lock-in TOF pixel.

The references to signal carrier or charge of a gate, signal carrier or charge under a gate, or the signal carrier or charge associated with the gate are used equivalently here and, in particular, mean the signal carrier or charge usually kept separate from an oxide layer of the gate by the potential field of the gate in the semiconductor substrate. Draining the gate means removing the charge under the gate.

The summation of the signal carriers, which are spatially separated in accordance with a correlation signal, in a storage gate may have the advantage of improving the signal-to-noise ratio.

The reception apparatus preferably comprises a weakly doped semiconductor substrate as photosensitive region for generating signal carriers. The correlation apparatus preferably comprises two modulation gates for spatial separation of the signal carriers in temporal correlation with respectively one different correlation signal and/or two storage gates, associated with the modulation gates, for summation of the correspondingly separated signal carriers. The difference-forming apparatus preferably comprises two transfer gates and/or floating diffusions and/or source followers, associated with the storage gates, for separate readout and conversion of the signal carriers separated and summed under the storage gates into two voltage values associated with the respectively summed signal carriers. The difference-forming apparatus preferably comprises a ramp apparatus, which lets the signal carriers drain under a first of the two storage gates prior to the readout and conversion, more particularly by means of a time slope, more particularly by parallel step-wise or continuous change of the potentials of the two storage gates, more particularly via the corresponding transfer gate, into the corresponding first of the two floating diffusions until the potential of the second floating diffusion starts to change. The difference-forming apparatus preferably comprises an A/D convertor (analog/digital convertor) for forming a digital value for a difference correlation value from the potential and/or the voltage value of the first floating diffusion.

In particular, in the case of photoelectrons as signal carriers, the aforementioned continuous change in the potentials can be given by a reduction in the potential.

The difference-forming apparatus is preferably designed to form the difference correlation values in the charge domain, in particular by comparing the signal carriers collected under the storage gates, in particular by operating the ramp apparatus such that the amount of charge of that floating diffusion which is associated with the more strongly charged storage gate corresponds to a difference correlation value.

In particular, the gates are arranged on the front side of the substrate. In particular, the gates on the front side can be covered by a stop which leaves the drift gate and/or, wholly or partly, the modulation gates exposed. This can lead to a defined signal-carrier generation in the region under the drift gate and/or the modulation gates.

In particular, the TOF distance sensor can be provided for taking-in the radiation though the front side or through the rear side. In particular, the reception sensor can comprise a rear-side contact for depleting the semiconductor substrate. In particular, to this end, gates or the rear-side contact can be wholly or partly transparent to the radiation.

In particular, this is how the correlation values and/or the difference correlation values on the level of the signal carriers and/or the charge carriers and/or the photoelectrons can be formed, particularly in an analog fashion. In particular, the difference formation can be analog at least in part, more particularly can occur at least in part on the level of the signal carriers, more particularly can occur at least in part on the level of the photoelectrons. In particular, the correlation values and/or difference correlation values can be present on the level of the signal carriers and/or charge carriers, in particular as an amount of charge, more particularly as charge under the storage gates.

The TOF distance measuring unit most recently specified with 2 modulation gates and 2 transfer gates is occasionally also referred to as 2-tap lock-in pixel in the literature.

A 4-tap lock-in pixel, which comprises 4 modulation gates and/or 4 transfer gates, is also feasible. For a 4-tap lock-in pixel, the ramp apparatus would then be used in each case for 2 structures of modulation gate and transfer gate, i.e. either sequentially or with 2 parallel ramp apparatuses.

The TOF distance sensor preferably comprises a plurality of reception sensors which form a pixel matrix for generating a 3D image.

The method according to the invention for operating a distance sensor comprises the following method steps: (I) emitting radiation from a light source, the radiation being modulated by a modulation signal; (II) receiving the emitted radiation, which was reflected by an object, by means of a reception sensor which has a predetermined spatial relationship with respect to the light source; (III) forming 4 correlation signals which are phase shifted with respect to one another and which have the same period as the modulation signal; (IV) correlating the received radiation or an equivalent variable with the 4 correlation signals in order to form 4 correlation values; (V) forming the difference between respectively 2 correlation values in order to form 2 difference correlation values; (VI) calculating the distance from the object with a linear dependence on the two difference correlation values.

In particular, the method steps can be carried out substantially continuously. In particular, the method steps can be carried out cyclically. In particular, the light source can emit radiation for a specific measurement duration and then pause for a further specific calculation duration during which the calculations are carried out, in order thereafter to restart the cycle from the beginning. In particular, the measurement duration can have a duration of 1000 periods of the modulation signal. In particular, the period duration of the measurement signal can be 20 MHz.

In particular, the cycle duration can be 20 ms. In particular, some method steps of a cycle can, wholly or partly, be carried out in parallel, for example emission and reception. In particular, some method steps of two successive cycles can, wholly or partly, be carried out in parallel, for example difference formation and/or calculation of the preceding cycle together with emission and/or reception and/or formation of a correlation value and/or correlation of the subsequent cycle.

The modulation signal and/or the 4 correlation signals are preferably embodied as rectangular signals.

The correlation signals are preferably respectively phase shifted by a quarter period with respect to one another and/or a correlation signal preferably has the same phase as the modulation signal.

The difference is preferably respectively formed from correlation values, the associated correlation signals of which are phase shifted by a half period.

In particular, 2 cycles, more particularly 2 time-offset cycles, can be carried out in the case of a 2-tap lock-in pixel. Here, in accordance with the 2 gate structures, the first cycle uses two first correlation signals, phase shifted by a half period, in order to form the first difference correlation value. The second cycle uses two correlation signals, which are phase offset by a half period and offset by a quarter period with respect to the correlation signals of the first cycle, in order to form the second difference correlation value. Hence both difference correlation values are present and the distance can be calculated. The cycle set from the first and the second cycle can now be implemented anew for a new measurement. This enables time-resolved distance measurement. In the description of the figures, the cycles are referred to as measurement phases.

Prior to calculation (VI), the method according to the invention preferably carries out a case distinction as a function of the 2 difference correlation values in order to associate the calculation with one of 4 different linear dependences.

The difference formation is preferably analog at least in part, more particularly occurs at least in part on the level of the signal carriers, more particularly occurs at least in part on the level of the photoelectrons, more particularly occurs in the charge domain, more particularly by correlating the received radiation with the 4 correlation signals by spatial separation of the signal carriers generated by the radiation in order to form 2 amounts of charge, corresponding to the correlation values, in the charge domain and by siphoning charge from one of the 2 amounts of charge until the 2 amounts of charge are equal such that the siphoned amount of charge corresponds to the difference correlation value.

The advantage can be an improved signal-to-noise ratio and/or an increased dynamic range.

In order to illustrate the 4 linear functions, the aforementioned variables are provided with the following designations:

Correlation values $A0, A1, A2$ and $A3$ with reference to the correlation signal forming them $A0$: from a correlation signal not offset with respect to the modulation signal;

$A1$: from a correlation signal offset by ¼ period with respect to the modulation signal;

$A2$: from a correlation signal offset by ½ period with respect to the modulation signal; and $A3$: from a correlation signal offset by ¾ period with respect to the modulation signal.

Difference correlation values C0 and C1 with the associated correlation values:

$$C0 := A0 - A2$$

$$C1 := A1 - A3$$

Instead of the distance, the functions for calculating the phase delay dPhi of the received radiation with respect to the emitted radiation are specified. The conversion into the precise distance emerges from the modulation frequency of the modulation signal of the emitted radiation. By way of example, as a function of the 2 difference correlation values, the 4 linear functions emerge as the following:

$$C0>0 \text{ and } C1>0 \text{ imply } dPhi=(Pi/4)*(((C1-C0)/(C0+C1))+1),$$

$$C0>0 \text{ and } C1<0 \text{ imply } dPhi=(Pi/4)*(((C1+C0)/(C0-C1))+7),$$

$$C0<0 \text{ and } C1>0 \text{ imply } dPhi=(Pi/4)*(((C1+C0)/(C1-C0))+3),$$

$$C0<0 \text{ and } C1<0 \text{ imply } dPhi=(Pi/4)*(((C1-C0)/(C0+C1))+5).$$

The distance D between object and TOF distance sensor emerges from half the distance of the traveled light path from the radiation source to the semiconductor substrate via the object. The distance emerges from the phase delay dPhi, with the number Pi, the speed of light c and the modulation frequency f as follows:

$$D=(c/(4*Pi*f))*dPhi.$$

The advantages of the invention can be seen in a reduction in the hardware complexity, an improvement of the signal-to-noise ratio, an increase in the dynamic range, an increase in the processing speed, an increase in the frame rate, a reduction in the calculation complexity, a reduction in the sensor dimensions and/or a greater integration on the level of the chip.

Further features of the invention are specified in the drawings.

BRIEF DESCRIPTION OF THE DRAWINGS

The invention will be explained in greater detail below on the basis of an exemplary embodiment with drawings. Here, the same reference signs in the individual figures denote the same elements.

DETAILED DESCRIPTION OF THE INVENTION

Figure 1:
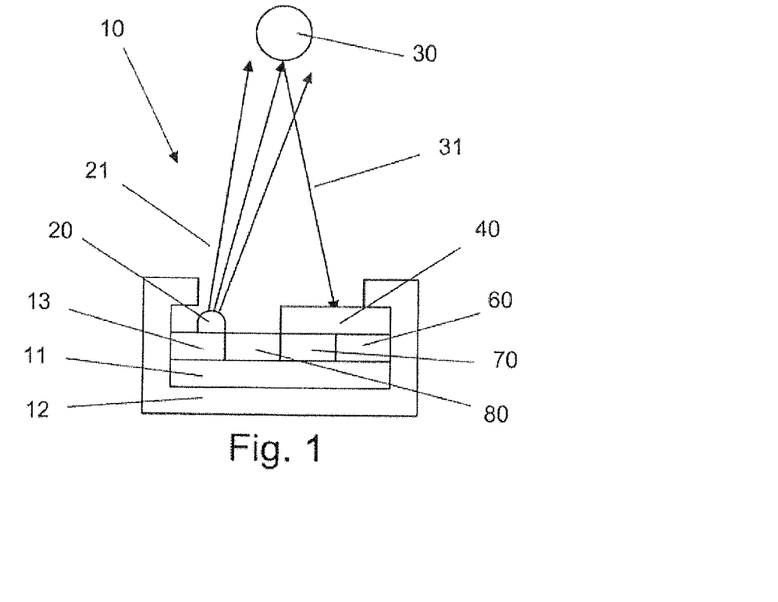
FIG. 1 shows the TOF distance sensor with object.

FIG. 1 shows the TOF distance sensor 10 with object 30. The object is at a distance from the TOF distance sensor. By way of example, the radiation source 20 is an LED or an arrangement of a plurality of LEDs. The radiation source is actuated by the electronics apparatus 13, which operates the radiation source in modulated fashion with a rectangular signal as modulation signal. By way of example, the radiation source emits monochromatic IR light 21, which is diffusely reflected at the object 30 and impinges on the reception apparatus 40 as reflected radiation 31. In the reception apparatus the received radiation generates a value profile of the induced photoelectrons and hence a signal profile for the received radiation. The correlation apparatus 60 is connected to the reception apparatus 40 and accepts the temporal value profile of the received radiation intensity. The electronics apparatus forms respectively 2 correlation signals for 2 measurement phases, which correlation signals are respectively accepted by the correlation apparatus. The correlation apparatus in each case correlates the correlation signals with the signal profile from the reception apparatus and generates 2 correlation values in each case. The difference-forming apparatus 70 is connected to the correlation apparatus and accepts the respectively 2 correlation values and forms respectively 2 difference correlation values, in each case from the difference of the 2 correlation values. The calculation apparatus 80 is connected to the correlation apparatus and accepts the two difference correlation values from the two measurement phases and calculates the distance of the object from the TOF distance sensor. The electronics apparatus 13, the reception apparatus 40, the correlation apparatus 60, the difference-forming apparatus 70 and the calculation apparatus 80 are integrated on a chip and embodied in a combined CMOS/CCD method. The chip and the radiation source 20 are arranged on a holder 11 and surrounded by a housing 12. The radiation source and the reception apparatus respectively have an optical apparatus (not illustrated in the figure), which focuses in the direction of space in which the distance of objects is to be determined.

The emitted radiation 21 has a wavelength of 860 nm and is pulsed with a rectangular signal of 20 MHz. The reflected radiation received by the reception apparatus 40 remains pulsed by a rectangular signal of 20 MHz and is phase shifted with respect to the modulation signal of the radiation emitted by the radiation source 20 by the time of the light path. The phase shift between emitted and received rectangular signal corresponds to twice the distance between TOF distance sensor and object.

Figure 2:
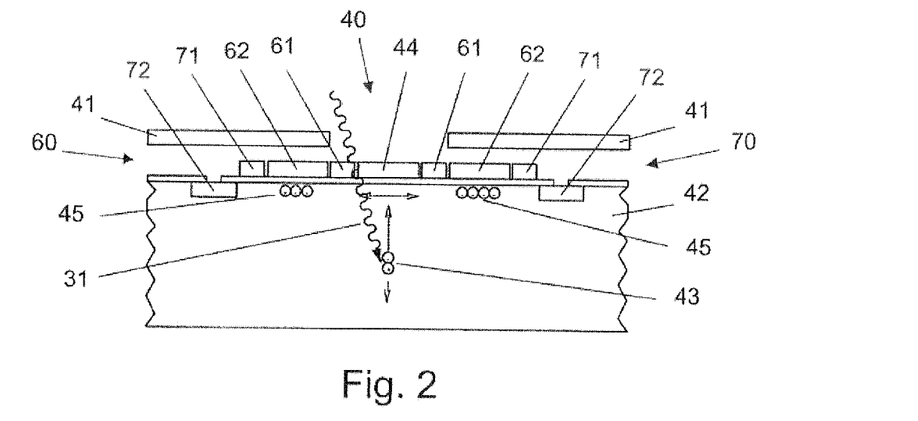
FIG. 2 shows the reception apparatus with correlation apparatus and parts of the difference-forming apparatus.

FIG. 2 shows the reception apparatus 40 with correlation apparatus 60 and parts of the difference-forming apparatus 70, integrated into a semiconductor chip. The reception apparatus 40 has a low n-doped float zone silicon semiconductor substrate 42 with a specific electrical sheet resistivity of greater than or equal to 2000 Ohm cm. Arranged on the surface of the semiconductor substrate there is a drift gate 44 and, on both sides in symmetric arrangement and respectively spaced apart from one another, respectively one modulation gate 61, one storage gate 62, one transfer gate 71 and one floating diffusion 72. The layer and contacts expedient for this have not been illustrated. A stop 41 is arranged over the gates, with the stop having an aperture in the region of the drift gate and shadowing the storage gates, transfer gates and the floating diffusion, together with the semiconductor substrate lying below the respective gates, from the incident reflected radiation 23. The semiconductor substrate is depleted at least under the drift gate. A positive potential is applied to the drift gate 44 and the latter forms a space-charge zone in the semiconductor substrate.

The reflected IR radiation 31, penetrating into the semiconductor substrate under the drift gate via the aperture, induces electron/hole pairs 43 in the semiconductor substrate 42.

As a result of the space-charge zone formed by the drift gate 44, the photoelectrons are attracted to the drift gate. The drift gate has a potential of approximately 4 V. The number of attracted photoelectrons is proportional to the received radiation intensity.

A modulated potential can be applied to the modulation gates 61, the maximum of which modulation potential lies between the potentials of the drift gate and the storage gate and the minimum of which modulation potential lies below that of the drift gate. The potential of the modulation gate modulates, for example, between the values of 0 V and 5 V. The two modulation gates are operated mutually with inverse potentials. This means that the potential of the one modulation gate is 0 V when the potential of the other one is positive, and vice versa. Then a potential of 0 V is always applied to the one modulation gate and a potential of 5 V is always applied to the other modulation gate. A potential minimum, i.e. 0 V in this case, leads to a potential barrier for the photoelectrons under the drift gate, and so no photoelectrons can reach the storage gate associated with the modulation gate. A potential maximum, i.e. 5 V in this case, leads to a drain of the photoelectrons under the drift gate, past the modulation gate and into the associated storage gate.

As a result of respectively applying a potential, which respectively corresponds to mutually inverse rectangular signals, to the two modulation gates, the flow of the photoelectrons generated by the received radiation intensity is controlled like a switch. The flow, generated thus, of these photoelectrons under the modulation gates corresponds to a multiplication, i.e. a correlation of the corresponding rectangular signals with the received radiation signal. Here, the rectangular signals have the property of a correlating signal and are referred to here as correlation signal.

As a result of the design of the correlation apparatus shown here, it is also possible for sinusoidal signals, which are used as correlation signals in place of the rectangular signals, to act as a digital switch for the photoelectrons. Therefore sinusoidal correlation signals also act like rectangular signals in this case. Thus, it is also possible in this case to use sinusoidal correlation signals and, for the purposes of the calculation, consider these as rectangular signals without the validity of the linear dependence derived below changing. This applies to all waveforms which periodically alternate between 2 values as correlation signals. In particular, the correlation signals can have a waveform which periodically alternates above and below a threshold such that, in a periodically alternating fashion, the corresponding potential of the modulation gates guides the photoelectrons under the storage gates in accordance with the aforementioned switch.

A higher potential s applied to the storage gates 62 than to the drift gate 44 and the storage gates alternately collect the photoelectrons 43, 45 under themselves in accordance with the status of the modulation gates. The storage gates for example have a potential of 10 V. The charges collected under the storage gates 62 by the photoelectrons 45 correspond to the correlation values. The correlation values are therefore present in the charge domain. The collection of the photoelectrons under the corresponding storage gates corresponds to integration over time of the aforementioned correlation of correlation signal and received radiation signal.

Figure 5:
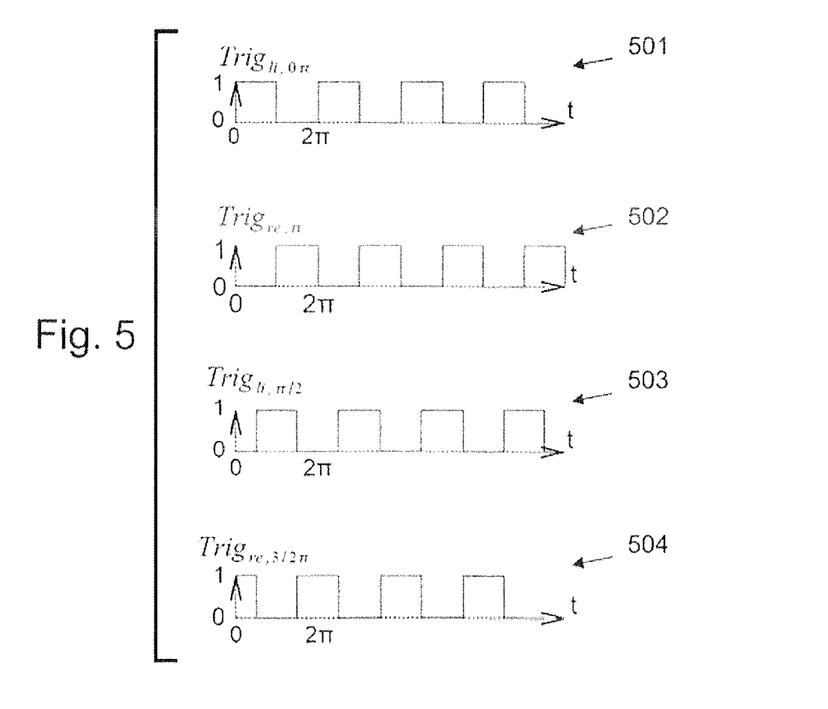
FIG. 5 shows the signal profiles of the correlation signals.

The correlation values thus present in a measurable fashion are defined as follows for the subsequent discussion on the basis of specific correlation signals in accordance with FIG. 5:

A0: from correlation signal 501 not offset with respect to the modulation signal;

A1: from correlation signal 502 offset by ¼ period with respect to the modulation signal;

A2: from correlation signal 503 offset by ½ period with respect to the modulation signal; and A3: from correlation signal 504 offset by ¾ period with respect to the modulation signal.

In order to detect the photoelectrons collected under the storage gate, the potential of the modulation gates is, on the one hand, set to 0 V in order to form a potential barrier for the photoelectrons in the direction of the drift gate. On the other hand, the potential of the transfer gates is raised to a value in the middle of the range, e.g. 6 V, in order to enable a limited drain of the photoelectrons in the direction of the floating diffusions.

Now the positive potential of both storage gates of approximately 10 V is lowered in parallel by means of a time slope. The added potential, changing in the process, from the decreasing positive potential applied to the storage gates and the negative potential of the charge situated therebelow determines whether charge can drain via the transfer gates. Here, the reduction process is divided into three phases. In a first phase of the time slope, the aforementioned added potential still is more positive than the constantly and equally positive potential of the transfer gates for both storage gates and no charge drains. In a subsequent second phase of the time slope, the aforementioned added potential is more positive than the constantly and equally positive potential of the transfer gates for one storage gate and more negative than this for the other storage gate. As a result, charge drains under the storage gate with the more positive added potential into the associated floating diffusion via the associated transfer gate, and so the added potential once again equals the potential of the corresponding transfer gate. In a final third phase of the time slope, the aforementioned added potentials of both storage gates are greater than the constantly equal potentials. As a result, charges drain under both storages gates into the respectively associated floating diffusion via the respectively associated transfer gate. The time slope is stopped directly with the onset of the third phase, i.e. the potential of the storage gates is not lowered any further such that essentially only the charge drain from the second phase is relevant. The amount of charge now present in a charged floating diffusion therefore corresponds to the difference in the amount of charge from the two storage gates. The time slope thus carries out a subtraction of the amounts of charge under the two storage gates. As explained above, the amount of charge collected under the two storage gates before carrying out the time slope corresponds to the corresponding correlation values. Hence the amount of charge of the one charged floating diffusion corresponds to the corresponding difference correlation value after carrying out the above-described time slope.

The amount of charge in the one charged floating diffusion is now converted into a corresponding voltage by means of a source follower and subsequently converted into a corresponding digital value by means of an AD convertor (analog/digital convertor). This digital difference correlation value is transmitted to the calculation apparatus for further calculations.

For the following explanations, the difference correlation values are defined as follows on the basis of the correlation values forming them:

$$C0:=A0-A2$$

$$C1:=A1-A3$$

The calculation apparatus is a digital circuit which is implemented on the same semiconductor chip as the reception apparatus, the correlation apparatus and the difference-forming apparatus. In particular, the reception apparatus, the electronics apparatus, the correlation apparatus, the difference-forming apparatus and the calculation apparatus are arranged in CMOS/CCD technology on a single semiconductor chip, more particularly as a system-on-chip.

Figure 3:
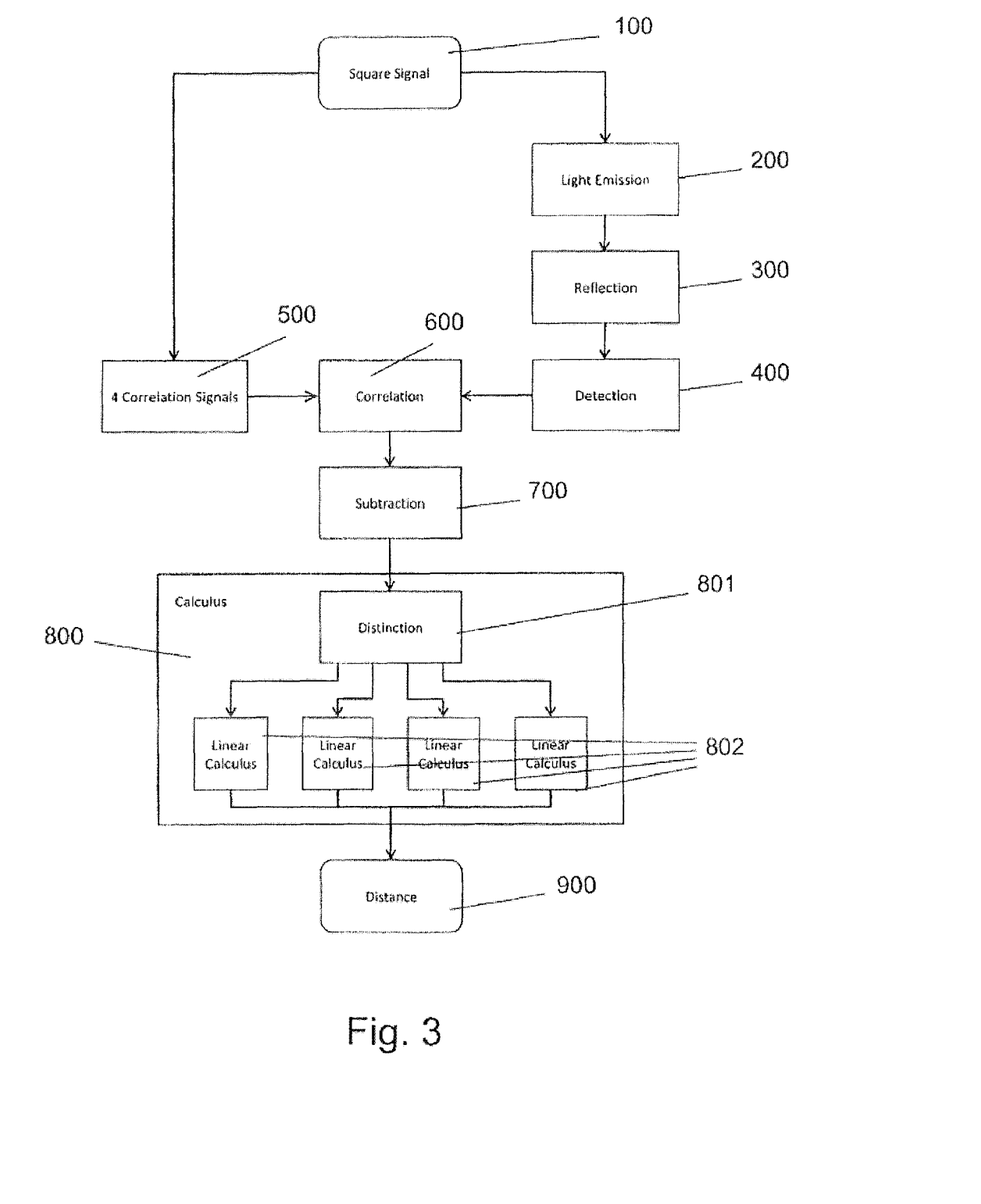
FIG. 3 shows a flowchart of the method for operating a TOF distance sensor.

FIG. 3 shows a flowchart of the method according to the invention for operating the TOF distance sensor according to FIGS. 1 and 2.

The electronics apparatus 13 generates a rectangular signal as modulation signal 100. The modulation signal could also be supplied externally to the TOF distance sensor. The modulation signal is synchronously transmitted to both the radiation source 20 for modulating the light emission 200 and to the correlation apparatus 60 for forming 500 4 correlation signals. On the object 30, the modulated light experiences a reflection 300 in the direction of the reception apparatus by which the reflected light is received 400. Both the signal information of the received light and the 4 correlation signals are transmitted to the correlation apparatus 60 for correlation 600 purposes. The correlation apparatus 60 correlates the signal information of the received light with the correlation signals and generates 4 correlation values therefrom. The 4 correlation values are transmitted from the correlation apparatus 60 to the difference-forming apparatus 70 for difference forming 700 purposes. The difference-forming apparatus forms 2 difference correlation values from the difference of respectively 2 correlation values and transmits these 2 difference correlation values to the calculation apparatus 80 for calculation 800 purposes. For calculation 800 purposes, the calculation apparatus 80 initially forms a case distinction 801 on the basis of the 2 difference correlation values and, in accordance with one of 4 linear functions, assigns the 2 difference correlation values for calculation purposes with a constant linear function 802. The calculation 802 from the 2 difference correlation values with the associated constant linear function as a result provides a value for the distance 900, which is output by the method.

In the following text, FIG. 4 to FIG. 15 show the method in detail on the basis of value profiles.

Figure 4:
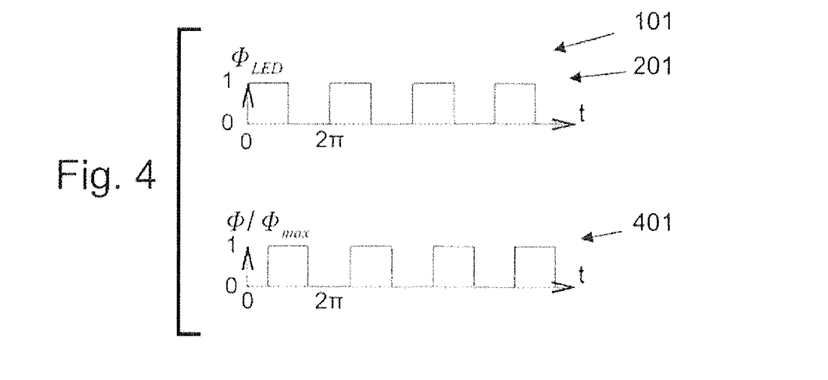
FIG. 4 shows the intensity profiles of emitted and received radiation.

The electronics apparatus 13 forms a rectangular signal 100 as a modulation signal 101 with the values of 0 and 1, with a frequency of 20 MHz and with a duty cycle of 50% (FIG. 4).

The modulation signal 101 modulates the light 201 emitted by the radiation source 20 in a pulse-like fashion with the same phase as the modulation signal 101. At the object 30, the emitted radiation 21 experiences a reflection 300 in the direction of the reception apparatus 40, which is designed for light reception 400 of the reflected light.

In accordance with the traveled distance, the received light has a phase shift with respect to the emitted light. In the following text, a phase shift of ½ pi (FIG. 4) for the received light 401 is assumed in an exemplary fashion.

Method steps 200 to 700, i.e. the method steps after generating the rectangular signal 100 or the modulation signal 101 until before the calculation 800, are carried out in two separate measurement phases, which respectively provide one of the two difference correlation values.

In the first measurement phase, the electronics apparatus 13 as part of the correlation apparatus 60 generates the two correlation signals 501 and 502 from the modulation signal 101. The first correlation signal 501 has the same phase as the modulation signal 101 while the second correlation signal 502 has a phase shift of pi with respect to the modulation signal (FIG. 5). Hence the two correlation signals are inverted with respect to one another.

Figure 6:
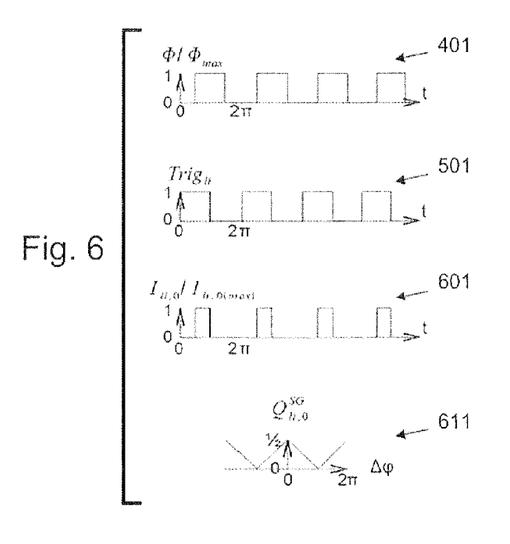
FIG. 6 shows the value profiles of the left-hand side of the reception sensor during a first exemplary measurement phase.
Figure 7:
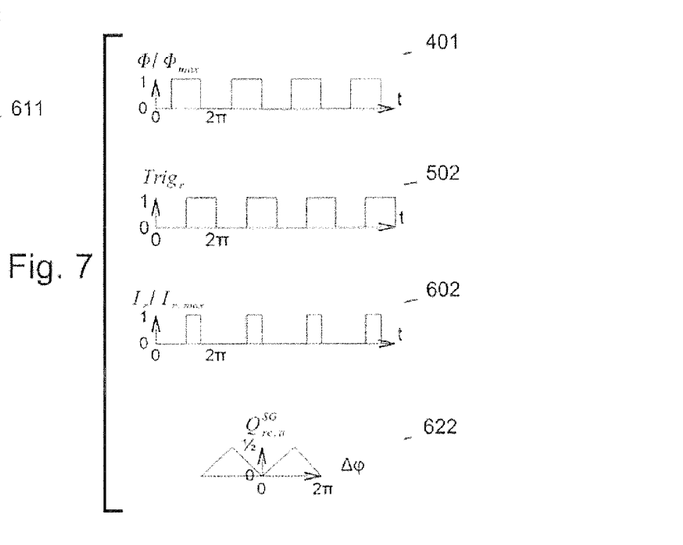
FIG. 7 shows the value profiles of the right-hand side of the reception sensor during a first exemplary measurement phase.

The left-hand the right-hand modulation gates as further parts of the correlation apparatus are now, in accordance with the first and the second correlation signal, modulated for the duration of a specific measurement time. FIG. 6 shows the phase profile 501 of the potential of the left-hand modulation gate and the phase profile 601 of the charge transmitted from the left-hand modulation gate to the associated storage gate. FIG. 7 shows the phase profile 502 of the potential of the right-hand modulation gate and the phase profile 602 of the charge transmitted from the right-hand modulation gate to the associated storage gate. In accordance with the explanations in respect of FIG. 2, charges collect under the associated storage gates.

The amounts of charge under the storage gates after the measurement time has expired are subtracted by means of the time slope and, in accordance with the explanations in respect of FIG. 2, provide the first difference correlation coefficient, which is fed to the calculation apparatus 80 for calculation 800 purposes. The calculation apparatus stores the first difference correlation coefficient in an intermediate storage.

In the second measurement phase, the electronics apparatus as part of the correlation apparatus 60 generates the two other correlation signals 503 and 504 from the modulation signal 101. The third correlation signal 503 has a phase shift of pi/2 with respect to the modulation signal 101 while the fourth correlation signal 504 has a phase shift of 3/2 pi with respect to the modulation signal 101. Hence the two correlation signals are inverted with respect to one another. The further progress of the second measurement phase corresponds to that of the first measurement phase.

Figure 10:
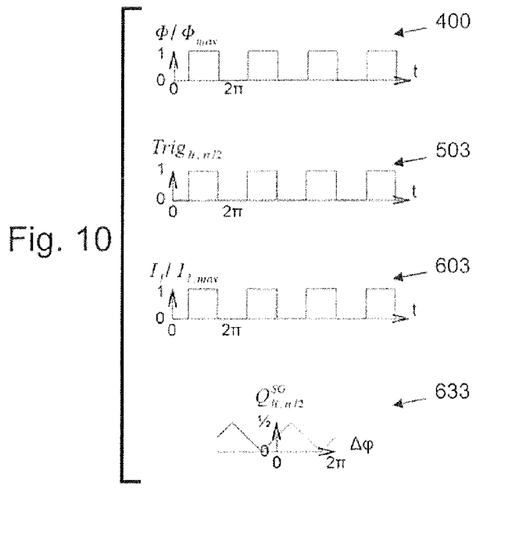
FIG. 10 shows the value profiles of the left-hand side of the reception sensor during a second exemplary measurement phase.
Figure 11:
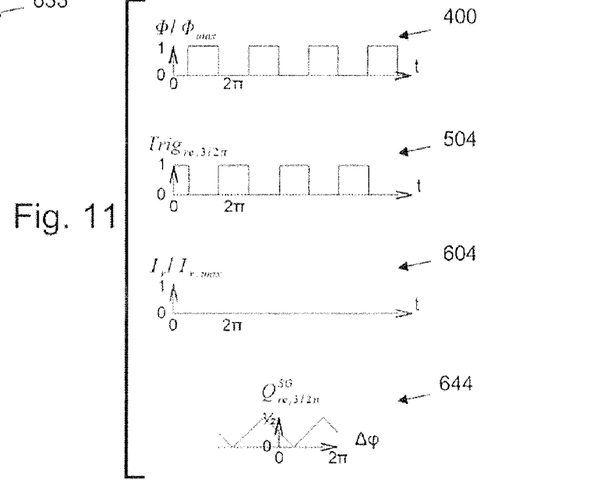
FIG. 11 shows the value profiles of the left-hand side of the reception sensor during a second exemplary measurement phase.

FIG. 10 shows the phase profile 503 of the potential of the left-hand modulation gate and the phase profile 603 of the charge transmitted from the left-hand modulation gate to the associated storage gate. FIG. 11 shows the phase profile 504 of the potential of the right-hand modulation gate and the phase profile 604 of the charge transmitted from the right-hand modulation gate to the associated storage gate.

This is how the second difference correlation value emerges in analog fashion; it is likewise fed to the calculation apparatus 80 for calculation purposes. Therefore the calculation apparatus has the first and the second difference correlation value after the second measurement phase.

As a result, the two measurement phases are complete and the calculation 800 can take place.

Figure 15:
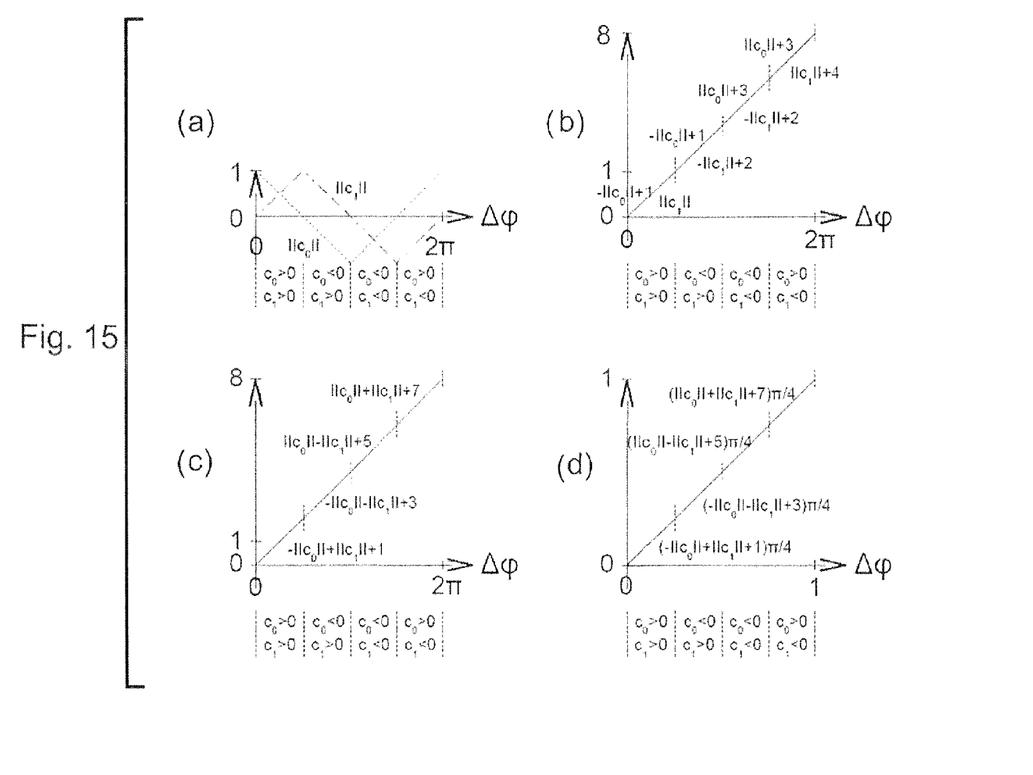
FIGS. 15(a)-(d) show the linear functions of the calculation apparatus.

In the following text, the general context of the measurement is initially to be explained before the derivation of the linear function in FIG. 15 is discussed.

As a result of the identical summation time, the shown phase profiles for the charge transmitted from each of the modulation gates 601, 602, 603, 604 to the respective storage gate correspond in terms of time profile to the charge of the storage gates prior to the comparison thereof and subtraction via the time slope and are in this case, in accordance with FIG. 4, illustrated in exemplary fashion for a phase difference of pi/2 between emitted and received radiation.

FIGS. 6, 7, 10, 11 now show the profile of the amount of charge collected under the storage gates, i.e. the profile of the correlation values 611, 622, 633, 644 as a function of the delay, i.e. the phase shift, i.e. the phase difference between emitted and received radiation (cf. 201 and 401 in FIG. 4 as an example), i.e. as a function of the distance from the object.

Figure 8:
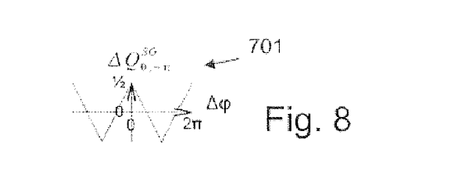
FIG. 8 shows the charge-difference profile during the first measurement phase.
Figure 12:
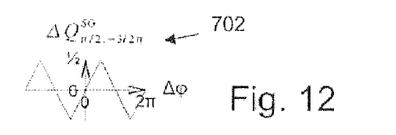
FIG. 12 shows the charge-difference profile during the second measurement phase.

FIGS. 8 and 12 now show the profile, created by difference formation from the correlation values of the same measurement phase, of the difference correlation value 701 and 702 resulting from the respective measurement phase, as a function of the phase difference between emitted and received radiation. Here, the profile of the difference correlation value 701 (FIG. 8) emerges from the difference of the profiles of the correlation values 611 and 622 (FIGS. 6 and 7). Here, the profile of the difference correlation value 702 (FIG. 12) emerges from the difference of the profiles of the correlation values 633 and 644 (FIGS. 10 and 11).

Figure 14:
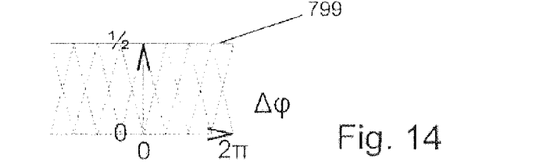
FIG. 14 shows the profile of the summed normalization function.

FIG. 14 shows the addition of the absolute values of the profiles of the two difference correlation values 701 and 702 as a function of the phase difference between emitted and received radiation. A constant phase profile 799 with a value of ½ results. Hence the sum of the absolute values of the phase profiles of the two difference correlation values provides a suitable normalization function for the difference correlation values.

The two normalized difference correlation values $\|C0\|$ and $\|C1\|$ emerge as follows from the two difference correlation values C0 and C1 and the normalization function ($|C0|+|C1|$), where "$|\ldots|$" denotes the absolute value function:

$$\|C0\| := C0/(|C0|+|C1|)$$

$$\|C1\| := C1/(|C0|+|C1|)$$

Figure 9:
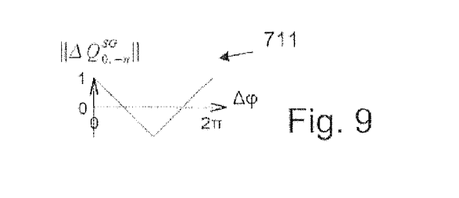
FIG. 9 shows the normalized charge-difference profile during the first measurement phase.
Figure 13:
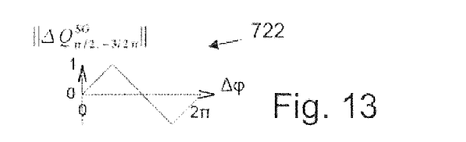
FIG. 13 shows the normalized charge-difference profile during the second measurement phase.

What emerges as a result of this normalization is the profile, shown in FIG. 9, of the normalized first difference correlation coefficient 711 and the profile, shown in FIG. 13, of the normalized second difference correlation value 722, respectively as a function of the phase difference between emitted and received radiation.

Normalization can be advantageous in that systematic deviations of the measured variables do not change the calculated variable. By way of example a systematic deviation can be a change in the received radiation intensity as a function of the distance.

FIG. 15 shows the plausible derivation of the linear functions.

FIG. 15a shows the two profiles of the two normalized difference correlation values from FIGS. 9 and 13 in a common illustration, as a function of the phase difference between emitted and received radiation.

The value range of the phase difference is subdivided into 4 regions, which respectively correspond to different combinations of the signs of the difference correlation values in the value range of the phase difference.

These different combinations of the signs of the difference correlation values form the basis for the case distinction 801. It is particularly advantageous for the respective signs to be present as the sign of the measured voltage or as specification as to whether the right-hand or the left-hand storage gate contained more charge.

FIG. 15b shows how the sub-intervals of the profile of the two difference correlation values are now newly assembled such that a monotonic linear function is created. The two difference correlation values are denoted by C0 and C1. The two normalized difference correlation values are denoted by $\|C0\|$ and $\|C1\|$. For the 4 regions, the sums dPhi emerge as:

$$C0>0 \text{ and } C1>0 => dPhi = -\|C0\|+1+\|C1\|$$

$$C0<0 \text{ and } C1>0 => dPhi = -\|C0\|+1-\|C1\|+2$$

$$C0<0 \text{ and } C1<0 => dPhi = +\|C0\|+3-\|C1\|+2$$

$$C0>0 \text{ and } C1<0 => dPhi = +\|C0\|+3+\|C1\|+4$$

The four regions overall extend over the phase range from 0 to pi and the sums of 0 to 8 in an overall constant linear fashion.

FIG. 15c shows the same phase profile as FIG. 15b.

FIG. 15d shows the phase profile like FIG. 15b, with the phase range and value range respectively being normalized to 1. For the 4 regions, the sums now emerge as:

$$C0>0 \text{ and } C1>0 => dPhi = (-\|C0\|+\|C1\|+1)*(pi/4)$$

$$C0<0 \text{ and } C1>0 => dPhi = (-\|C\|-\|C1\|+3)*(pi/4)$$

$$C0<0 \text{ and } C1<0 => dPhi = (+\|C0\|-\|C1\|+5)*(pi/4)$$

$$C0>0 \text{ and } C1<0 => dPhi = (+\|C0\|+\|C1\|+7)*(pi/4)$$

Hence, after adjusting for the signs, the sums emerge as:

$$C0>0 \text{ and } C1>0 => dPhi = (((C1-C0)/(C0+C1))+1)*(pi/4)$$

$$C0<0 \text{ and } C1>0 => dPhi = (((C1+C0)/(C0-C1))+3)*(pi/4)$$

$$C0<0 \text{ and } C1<0 => dPhi = (((C1+C0)/(C1-C0))+5)*(pi/4)$$

$$C0>0 \text{ and } C1<0 => dPhi = (((C1-C0)/(C0+C1))+7)*(pi/4)$$

These are the linear functions for determining a distance value from any difference correlation values from the following formula, which has already been specified above:

$$D = (c/(4*pi*f))*dPhi.$$

LIST OF REFERENCE SIGNS

10 TOF distance sensor
11 Holder
12 Housing
13 Electronics apparatus
20 Radiation source
21 Emitted radiation
30 Object
31 Reflected radiation
40 Reception apparatus
41 Stop
42 Semiconductor substrate
43 Electron/hole pairs
44 Drift gate
45 Photoelectrons
60 Correlation apparatus
61 Modulation gate
62 Storage gate 70 Difference-forming apparatus
71 Transfer gate
72 Floating diffusion
80 Calculation apparatus
100 Generating rectangular signal
200 Light emission
300 Reflection
400 Light reception
500 Formation of 4 correlation signals
600 Correlation
700 Difference formation
800 Calculation
801 Case distinction
802 Calculation using constant linear functions
900 Output of a distance measure
101 Modulation signal
201 Emitted light signal
401 Received light signal (example)
501 Correlation signal 1 (without phase shift)
502 Correlation signal 2 (phase shift of pi)
503 Correlation signal 3 (phase shift of ½ pi)
504 Correlation signal 4 (phase shift of 3/2 pi)
601 Correlation value 1 (example)
602 Correlation value 2 (example)
603 Correlation value 3 (example)
604 Correlation value 4 (example)
611 Correlation value 1
622 Correlation value 2
633 Correlation value 3
644 Correlation value 4
701 Difference correlation value 1
711 Normalized difference correlation value 1
702 Difference correlation value 2
722 Normalized difference correlation value 2
799 Normalization function

What is claimed:

1. A TOF distance sensor for measuring a distance from an object, comprising:
an electronics apparatus for generating a modulation signal and for generating four correlation signals, which are phase shifted with respect to one another and which have the same period as the modulation signal;
a radiation source for emitting radiation, which is modulated by the modulation signal;
a reception apparatus, which has a predetermined spatial relationship with respect to the radiation source, for receiving radiation reflected by the object;
a correlation apparatus for correlating the received radiation or a corresponding variable with respectively one of the four correlation signals in order to form four corresponding correlation values;
a difference-forming apparatus for forming two difference correlation values from the difference between respectively two of the correlation values;
a calculation apparatus embodied to calculate the distance with a predetermined linear dependence on the two difference correlation values.

2. The TOF distance sensor according to claim 1, wherein the modulation signal and/or the four correlation signals are embodied as rectangular signals.

3. The TOF distance sensor according to claim 1, wherein the correlation signals are respectively phase shifted by a quarter period with respect to one another and/or a correlation signal has the same phase as the modulation signal.

4. The TOF distance sensor according to claim 1, wherein the difference-forming apparatus is designed to form the difference in each case from correlation values, the associated correlation signals of which are phase shifted by a half period.

5. The TOF distance sensor according to claim 1, wherein the calculation apparatus is designed for the association with at least two different linear dependences as a function of the two difference correlation values and for calculating the distance as a function of the association.

6. The TOF distance sensor according to claim 1, wherein the reception apparatus comprises at least one from the group consisting of (i) a substrate with a photosensitive region for generating signal carriers,
and (ii) a drift gate for generating a drift field for transporting the signal carriers.

7. The TOF distance sensor according to claim 6, wherein the reception apparatus comprises a weakly doped semiconductor substrate as photosensitive region for generating signal carriers.

8. The TOF distance sensor according to claim 7, wherein the distance-forming apparatus is designed to form the difference correlation values in the charge domain.

9. The TOF distance sensor according to claim 1, wherein there are a plurality of reception sensors which form a pixel matrix for generating a 3D image.

10. A method for operating a distance sensor, comprising the method steps of emitting radiation from a light source, the radiation being modulated by a modulation signal;
receiving the emitted radiation, which was reflected by an object, by means of a reception sensor which has a predetermined spatial relationship with respect to the light source;
forming four correlation signals which are phase shifted with respect to one another and which have the same period as the modulation signal;
correlating the received radiation or an equivalent variable with the four correlation signals in order to form four correlation values;
forming the difference between respectively two correlation values in order to form two difference correlation values;
calculating the distance from the object with a linear dependence on the two difference correlation values.

11. The method according to claim 10, wherein the modulation signal and/or the four correlation signals are embodied as rectangular signal.

12. The method according to claim 10, wherein the correlation signals are respectively phase shifted by a quarter period with respect to one another and/or a correlation signal has the same phase as the modulation signal.

13. The method according to claim 10, wherein the difference is respectively formed from difference correlation values, the associated correlation signals of which are phase shifted by a half period.

14. The method according to claim 10, comprising the method step of case distinction as a function of the two difference correlation values in order to associate the calculation with one of four different linear dependences.

15. The method according to claim 10, wherein the difference formation is analog at least in part.

16. The TOF distance sensor according to claim 1, wherein the correlation apparatus comprises at least one from the group consisting of (1) at least one modulation gate for correlating the received radiation with at least one of the correlation signals by virtue of a spatial separation of the signal carriers being undertaken as a function of one of the correlation signals, (2) at least one storage gate for temporal summation of the signal carriers, spatially separated in accordance with a correlation signal, for forming one of the correlation values, and (3) at least one storage element for holding another correlation value.

17. The TOF distance sensor according to claim 16, wherein the reception apparatus comprises a weakly doped semiconductor substrate as photosensitive region for generating signal carriers.

18. The TOF distance sensor according to claim 16, wherein the correlation apparatus comprises at least one from the group consisting of (1) two modulation gates for spatial separation of the signal carriers in temporal correlation with respectively one different correlation signal, and (2) two storage gates, associated with the modulation gates, for separate summation of the separated signal carriers.

19. The TOF distance sensor according to claim 16, wherein the difference-forming apparatus comprises at least one from the group consisting of (1) two transfer gates, floating diffusions, or source followers associated with the storage gates for separate readout and conversion of the signal carriers separated and summed under the storage gates into two voltage values associated with the respective storage gates, (2) a ramp apparatus, which lets the signal carriers drain under a first of the two storage gates prior to the readout and conversion, more particularly by means of a time slope into the corresponding first of the two floating diffusions until the potential of the second floating diffusion starts to change, and (3) an A/D converter for forming a value for a difference correlation value from the voltage value of the first floating diffusion.

20. The TOF distance sensor according to claim 6, wherein the signal carriers are photoelectrons.

21. The TOF distance sensor according to claim 16, wherein the at least one storage element is a further storage gate.

22. The TOF distance sensor according to claim 19, wherein the ramp apparatus lets the signal carriers drain under a first of the two storage gates prior to the readout and conversion by one from the group consisting of (1) means of a time slope, (2) parallel step-wise or continuous change of the potentials of the two storage gates, and (3) the corresponding transfer gate.

23. The TOF distance sensor according to claim 8, wherein the distance-forming apparatus is designed to form the difference correlation values in the charge domain by operating the ramp apparatus such that the amount of charge of that floating diffusion which is associated with the more strongly charged storage gate corresponds to a difference correlation value.

24. The TOF distance sensor according to claim 15, wherein the difference formation occurs (1) at least in part at the level of the signal carriers, (2) at least in part at the level of the photoelectrons, (3) at least in part at the charge domain, or (4) by correlating the received radiation with the four correlation signals by spatial separation of the signal carriers generated by the radiation in order to form two amounts of charge, of which there are two, corresponding to the correlation values, in the charge domain and by siphoning charge from one of the two amounts of charge until the two amounts of charge are equal such that the siphoned amount of charge corresponds to the difference correlation value.

* * * * *